(12) United States Patent
Suzuki et al.

(10) Patent No.: US 6,190,016 B1
(45) Date of Patent: Feb. 20, 2001

(54) IRRADIATION DEVICE FOR AN ALIGNMENT LAYER OF A LIQUID CRYSTAL CELL ELEMENT

(75) Inventors: Shinji Suzuki, Kawasaki; Osamu Mizuno, Mishima, both of (JP)

(73) Assignee: Ushiodenki Kabushiki Kaisha, Tokyo (JP)

( * ) Notice: Under 35 U.S.C. 154(b), the term of this patent shall be extended for 0 days.

(21) Appl. No.: 09/179,201

(22) Filed: Oct. 27, 1998

(30) Foreign Application Priority Data

| Oct. 29, 1997 | (JP) | 9-296620 |
| Oct. 29, 1997 | (JP) | 9-296621 |
| Apr. 10, 1998 | (JP) | 10-098874 |
| Apr. 10, 1998 | (JP) | 10-098875 |

(51) Int. Cl.[7] .................................................. G02B 5/30
(52) U.S. Cl. ........................... 362/19; 359/484; 359/485; 359/486
(58) Field of Search ............................... 362/19; 359/484, 359/485, 486, 487, 488, 489, 490

(56) References Cited

U.S. PATENT DOCUMENTS

| 4,195,422 | * | 4/1980 | Budmiger | 35/25 |
| 5,909,314 | | 6/1999 | Oka et al. | 359/582 |
| 5,934,780 | * | 8/1999 | Tanaka | 362/19 |
| 6,064,524 | | 5/2000 | Oka et al. | 359/582 |

FOREIGN PATENT DOCUMENTS

| 0 754 976 | 1/1997 | (EP) . |
| 2 309 794 | 8/1997 | (GB) . |
| 7-318861 | 8/1995 | (JP) . |
| WO 97/37273 | 10/1997 | (WO) . |

OTHER PUBLICATIONS

Masaki Hasegawa et al., Nematic Homogeneous Alignment By Photo Depolymerization Of Polymide, Proceedings Of The International Display Research Conference Japan Display, Jan. 1, 1994, pp. 213–216, XP–00646416, Figure 2.

Fumitomo Abe, Irradiation Device for an LCD Element, Denshizairyo Kogyochosakai, (Electronic Materials Research Company of the Industry), Published in Jul. 1995, pp. 95 to 99.

\* cited by examiner

*Primary Examiner*—Mohammad Y. Sikder
(74) *Attorney, Agent, or Firm*—Nixon Peabody LLP; David S. Safran

(57) ABSTRACT

Uniform irradiation of an entire region to be irradiated with polarized light for optical alignment of a liquid crystal cell element using a small polarization element is achieved by light, which contains UV radiation emitted from a lamp, being focused by an oval focusing mirror, and being incident via a first planar mirror and a polarization element using a multilayer film on an integrator lens which makes a uniform distribution of the portion of unpolarized light or the distribution of the illuminance of the polarized light in a certain direction and the distribution of the polarization direction. The extinction ratio of the polarized light emerging from the integrator lens is therefore made uniform over the entire region to be irradiated even if scattered light is incident on the polarization element. The light emerging from the integrator lens is incident on a bandpass filter via a shutter. The polarized light in a predetermined wavelength range is incident, via a second planar mirror, on a workpiece, such as a liquid crystal cell element or the like. Furthermore, a polarization element using the Brewster angle or the like can also be used.

8 Claims, 10 Drawing Sheets

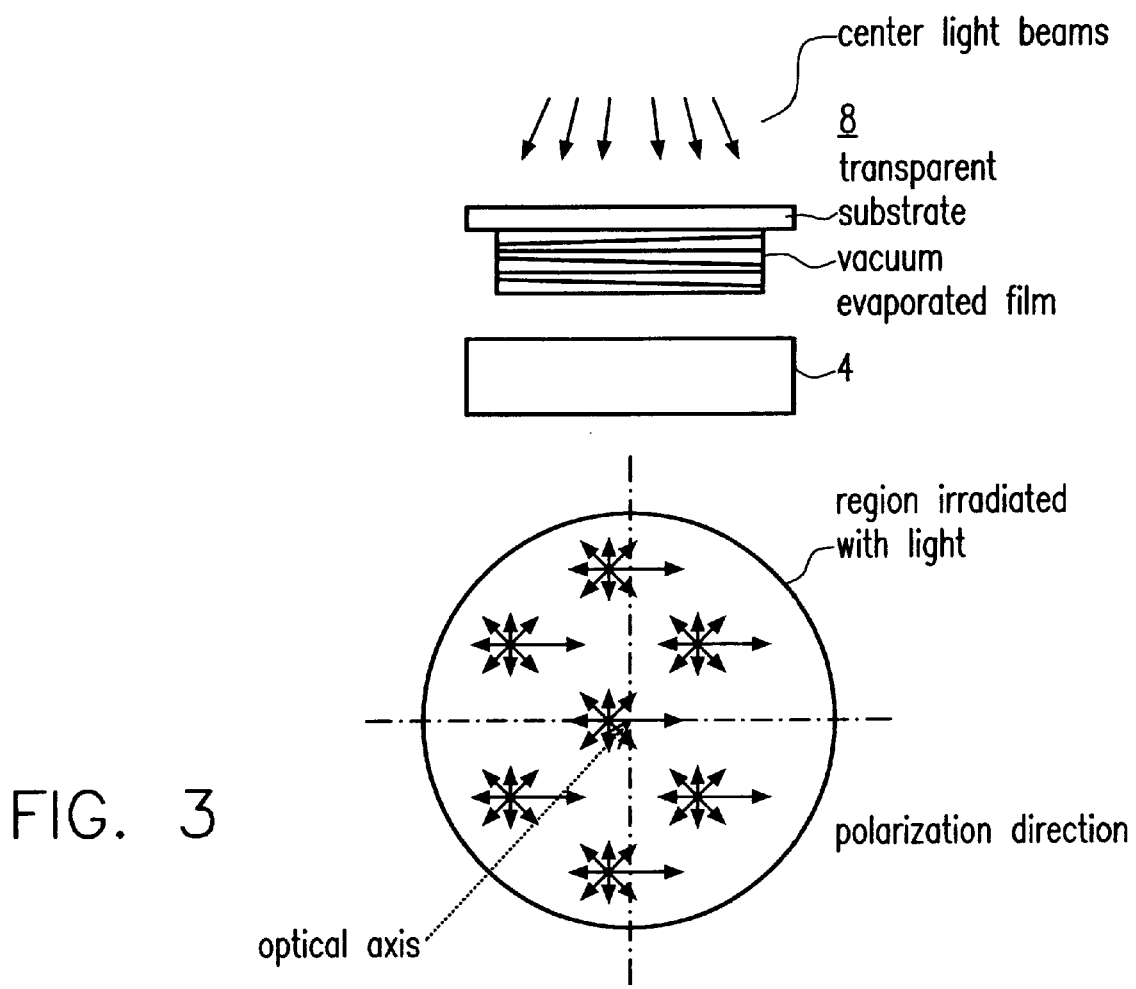
FIG. 3
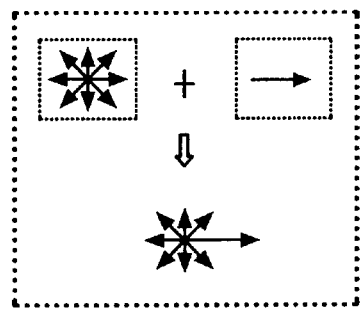

IRRADIATION DEVICE FOR AN ALIGNMENT LAYER OF A LIQUID CRYSTAL CELL ELEMENT

BACKGROUND OF THE INVENTION

1. Field of the Invention

The invention relates to a polarized light irradiation device for purposes of optical alignment of liquid crystals by irradiation of an alignment layer of a liquid crystal cell element with polarized light.

2. Description of Related Art

A liquid crystal cell element usually consists of two substrates. On one of these substrates a driver system for triggering a liquid crystal (for example, a thin film transistor), electrodes for triggering the liquid crystals which are formed of transparent conductive films, and an alignment layer or the like for alignment of the liquid crystals in a certain direction are formed. On the other of these substrates, a light screening film is formed which is called a black matrix. In a color liquid crystal cell element, a color filter, electrodes for triggering the liquid crystal, and an alignment layer are formed.

The alignment layer is usually produced by subjecting the surface of a thin layer, such as polyimide resin or the like, to treatment which is called rubbing, and by providing it with fine grooves in a certain direction; this is designed to align the molecules of the liquid crystal along these grooves in a certain direction. In this rubbing treatment, a process is commonly used in which the alignment layer is produced by rubbing the substrate with a cloth, which is called the rubbing cloth, and with which a turning roller is wound.

Rubbing formation of the alignment layer is done by rubbing the substrate with a rubbing cloth. In doing so, occurrence of adverse effects such as dust, static electricity, scratches and the like and a decrease of yield cannot therefore be prevented.

Recently, therefore, a technique was proposed in which alignment of the liquid crystals is produced without the alignment layer being subjected to the above described rubbing (the technique of aligning the liquid crystal without rubbing is hereinafter called "nonrubbing").

The nonrubbing technique is a process using polarized light. In this process, the following is performed.

1) The thin layer, as the alignment layer, such as a polyimide resin or the like, is irradiated with polarized light. The polymer of the thin layer is subjected to polarization and a structural change produced only in a certain direction by a photochemical reaction.

2) In this way, alignment of the molecules of the liquid crystal on the thin layer is produced (hereinafter, this alignment technique is called the "optical alignment technique").

In this process, UV radiation (ultraviolet radiation) with high energy is often used as the emitted polarized light. Recently, an alignment layer material has also been developed in which polarization or structural change is produced by visible radiation.

FIG. 12 shows, in schematic form, a known arrangement of an irradiation device which emits polarized light and executes optical alignment of the alignment layer of a liquid crystal cell element. The device of U.S. Pat. No. 5,934,780 possesses such an arrangement.

In the figure, an irradiation device 10 has a lamp 1 which emits light which contains UV radiation emitted which is focussed by an oval focusing mirror 2, reflected by a first planar mirror 3, and is incident on an integrator lens 4 (which may also be called a fly eye lens). The light emerging from the integrator lens 4 is incident via a shutter 5 and via a second planar mirror 6 on a collimation lens 7, which converts the light into parallel light, which is incident on a polarization element 8. The polarized light emerging from the polarization element 8 is incident on a workpiece W, such as a liquid crystal cell element or the like.

However, to produce a liquid crystal cell, a large surface is needed. On the outlet side of the collimation lens, therefore, the light flux spreads. Therefore, a gigantic polarization element is needed to obtain light polarized over the entire region to be irradiated.

SUMMARY OF THE INVENTION

In view of the foregoing, a primary object of the invention is to devise an irradiation device for an alignment layer of a liquid crystal cell element in which the need for a large polarization element can be avoided.

This object is achieved in accordance the invention in an irradiation device for an alignment layer of a liquid crystal cell element by the following sets of features.

(1) A lamp;
 a focusing mirror for the light of this lamp;
 an integrator lens; and
 a polarization element located on the incidence side of the integrator lens.

(2) A lamp;
 a focusing mirror for the light of this lamp;
 an integrator lens;
 an input lens which converts beams in the optical path, which emerge from the middle of the opening of the focusing mirror and which are incident in the respective center of the respective lens element which forms the integrator lens, into parallel beams on the incidence side of the integrator lens and which is located between the focusing mirror and the integrator lens; and
 a polarization element which is located in the optical path between the input lens and the integrator lens.

(3) A lamp;
 a focusing mirror for the light of this lamp;
 an integrator lens;
 a first lens which is located on the outlet side of the integrator lens and from which parallel beams emerge;
 a second lens which converts the parallel beams emerging from the first lens into nonparallel scattered light; and
 a polarization element which is located in the optical path between the first lens and the second lens.

To make the polarization element smaller, it can be located in an area in which the light is focussed (i.e. in the vicinity of the integrator lens). However, one such location at which the light is focussed is hot. Therefore, either a multilayer film (an interference film) or a polarization element in which several glass plates are placed at the Brewster angle relative to one another, or the like, are used.

In these polarization elements, however, uniform polarized light cannot be obtained over the entire area to be irradiated if no parallel light is incident. Nonparallel light is incident on the above described location on which the light is focussed. The angle of the light incident in the center of the polarization element therefore differs from the angle of the light incident in the outside peripheral area.

Here, the term "parallel light" is defined as light in which beams in the optical path which emerge from the center of the light source and which are each incident on any point on the surface to be irradiated are parallel to one another on the light incidence side of the surface to be irradiated. These beams in the optical path which emerge from the center of the light source are hereinafter called "center light beams."

In the polarization element using the multilayer film (interference film), therefore, the proportion of nonpolarized light is large in the outside peripheral area of the region to be irradiated.

In the polarization element using the Brewster angle, in the outside peripheral area the illuminance of a given portion of the polarized light decreases and the polarization direction also changes.

However, the inventors as a result of extensive research have ascertained the following and devised the invention:
(1) When the extinction ratio of the polarized light with which the alignment layer is irradiated, i.e., the portion of polarized light in a given direction in all the emitted light, has a certain value, optical alignment of the alignment layer can be done. That is, the liquid crystal molecules on the alignment layer can be aligned.
(2) The distribution of the portion of unpolarized light (the location-dependent magnitude of the portion of unpolarized light) or the distribution of the illuminance of the polarized light in a certain direction and the distribution of the polarization direction (the location-dependent difference of the polarization direction) can be made uniform by the integrator lens.
(3) If on the incidence side of the polarization element, there is a lens which allows the focussed light or the scattered light to be incident and allows the parallel light to emerge, the parallel light can be incident on the polarization element.

The polarization element using the multilayer film or the polarization element using the Brewster angle can be used as the polarization element. Furthermore, when the polarization element using the Brewster angle is used on the surface of at least one glass plate, a multilayer film can be formed with a high transmission factor for P-polarized light and a high reflectance factor for the S-polarized light and improvement of the extinction ratio can be attempted.

In the case of the arrangement of the polarization element in front of the integrator lens the advantages are the following:

The unpolarized light in the outside peripheral area of the polarization element is scattered over the entire region to be irradiated, by which the extinction ratio of the polarized light is made uniform over the entire region to be irradiated.

The level of unpolarized light in the outside peripheral region is therefore below the level which has an adverse effect on optical alignment of the alignment layer. Thus, in the outside peripheral area of the region to be irradiated, a polymer reaction can be suppressed outside of a specific direction to less than or equal to a stipulated amount. Therefore, local formation of faults in the outside peripheral area of the region to be irradiated can be prevented. In this way, yield can be increased.

Furthermore, parallel beams can be allowed to be incident on the polarization element when the light is incident on the polarization element via the lens from which the parallel beams are emerging. Thus, over the entire region of the surface of the alignment layer to be irradiated uniform polarized light can be obtained. Therefore, local formation of faults in the outside peripheral area of the region to be irradiated can be prevented. In this way, yield can be increased.

In addition, in the polarization element using the Brewster angle composed of several glass plates, a dielectric multilayer film with a high transmission factor for P-polarized light and a high reflectance factor for S-polarized light can be vacuum evaporated on at least one glass plate.

In this way, the S-polarized light which passes through the glass plate provided with the multilayer film can be reduced, and thus, the extinction ratio improved.

The same effect can be obtained regardless of whether this multilayer film is formed on the surface of the glass plate or on its back.

It is irrelevant on which glass plates the multilayer film is formed. However, if the film is located on the surface of the first glass plate on the incidence side, reflection can take place in one step with the greatest intensity of the portion of S-polarized light. In this way, the portion of S-polarized light which is incident on the polarization element can be reduced with the greatest effectiveness. Furthermore, multipath reflection prevents the portion of S-polarized light reflected by the multilayer film from passing through the polarization element, so that the extinction ratio is improved.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 3 shows a schematic in which the extinction ratio of the polarized light is made uniform by means of the integrator lens when a polarization element using a multilayer film is used;

DETAILED DESCRIPTION OF THE PREFERRED EMBODIMENT

Figure 1:
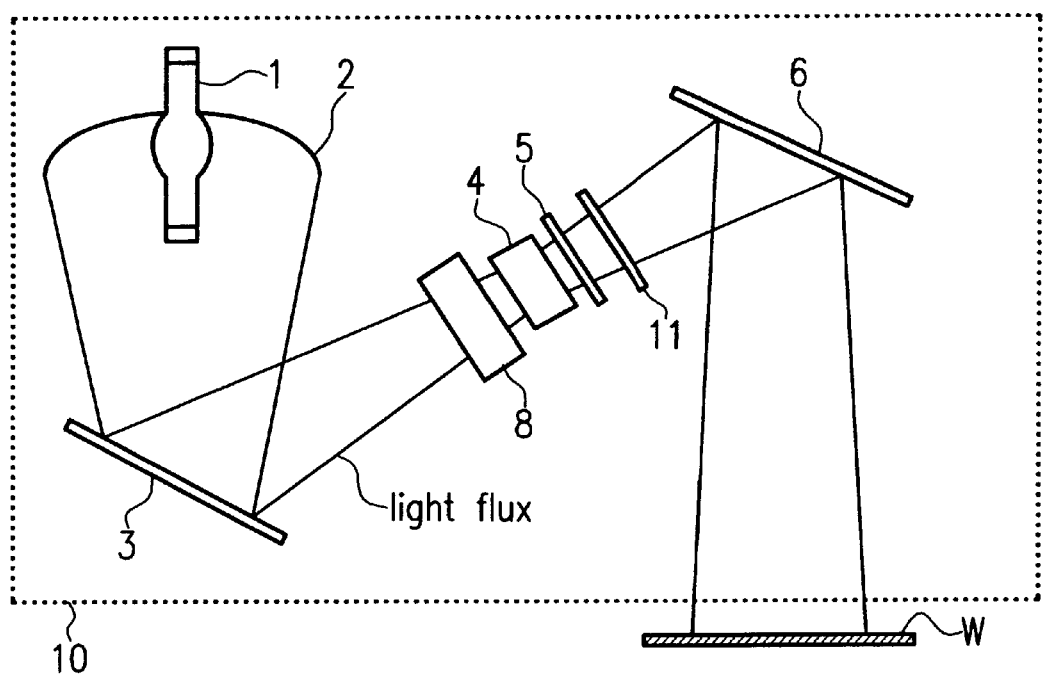
FIG. 1 shows a schematic of the arrangement of a first embodiment of the irradiation device as claimed in the invention.
Figure 12:
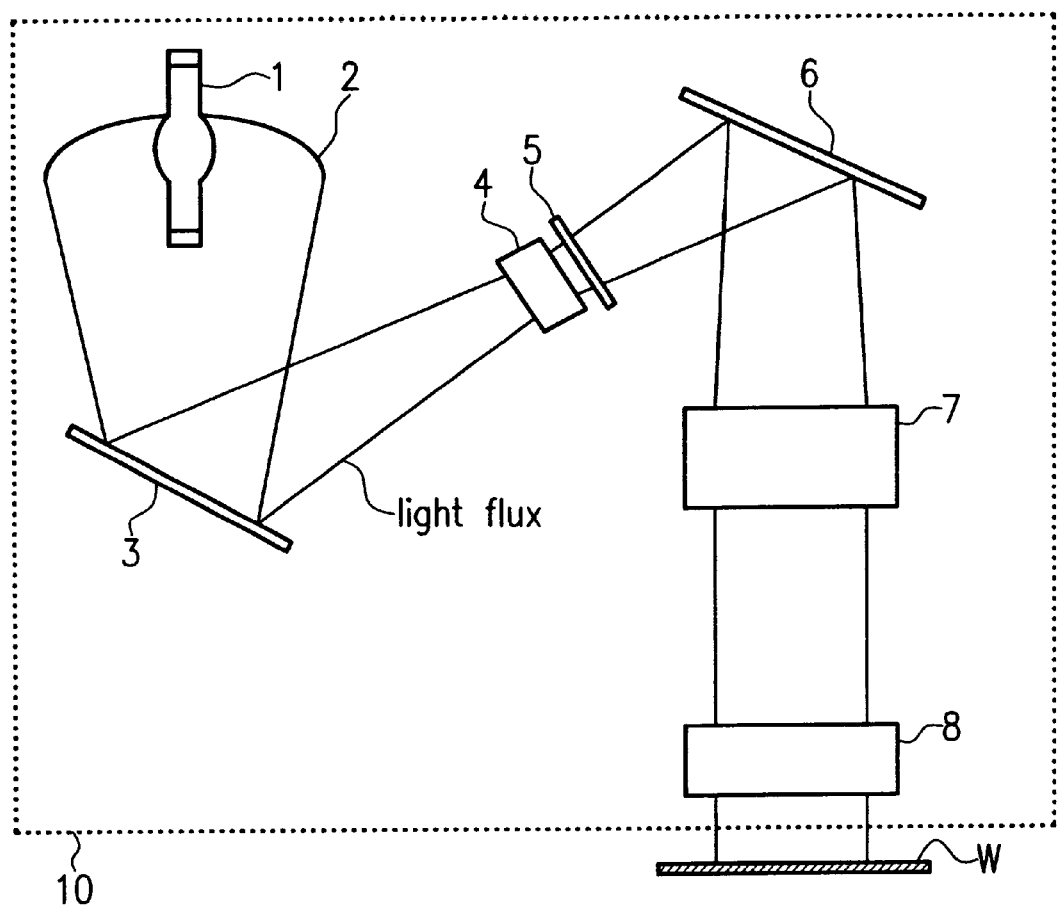
FIG. 12 shows a schematic of a conventional irradiation device in which optical alignment of an alignment layer of a liquid crystal cell element is effected.

FIG. 1 is a schematic of a first embodiment of the above described approach (1) in accordance with the present invention. In the drawings, the same parts as shown for the known device in FIG. 12 are provided with the same reference numbers. In this embodiment, a polarization element 8 using a multilayer film is located on the incidence side of an integrator lens 4. A bandpass filter 11 is located on the outlet side of a shutter 5. This bandpass filter 11 screens light which is polarized by the polarization element 8 and which lies in a wavelength range outside a certain (stipulated) wavelength range. The bandpass filter 11 can be placed in any position in the optical path between the oval focusing mirror 2 and a workpiece W. In the figure, the light which contains the UV radiation emitted from a lamp 1 is focused by the oval focusing mirror 2, reflected by a first planar mirror 3 and is incident on the polarization element 8 using the multilayer film.

In the polarization element 8, the light interference of the multilayer film is used. By means of an interference effect, a portion of the polarized light with a certain wavelength range is screened or attenuated. The certain wavelength range in which this portion of polarized light is screened or attenuated is conventionally a few dozen nm to a few hundred and some ten nm, and therefore has a low width.

In this case, if a lamp with an emission range in a wide wavelength range, such as a super-high pressure mercury lamp, a xenon lamp or the like, is combined with a polarization element and used, the light in the wavelength range outside the certain wavelength range passes through the polarization element without being polarized.

It is therefore necessary to additionally use the bandpass filter 11 to screen the light of wavelengths that are outside of the certain wavelength range. Furthermore, instead of the bandpass filter 11, a wavelength selection mirror can be used.

The wavelength characteristic of this bandpass filter 11, of course, lies in adequately screening the unpolarized light emerging from the polarization element. This means that the transmission wavelength width of the bandpass filter and the reflection wavelength width of the wavelength selection mirror are fixed at slightly less than or equal to the width of the wavelength range in which screening or attenuation by the polarization element takes place.

In FIG. 1, the light incident on the polarization element 8 is not parallel light because it was focused by the oval focusing mirror 2 and was reflected by the first planar mirror 3. Therefore, in the vicinity of the optical axis of the area to be irradiated in a certain wavelength range, polarized light is obtained, while unpolarized light is obtained outside of the peripheral area.

These circumstances are explained in greater detail below.

When the angle of incidence of the light incident on the multilayer film of the polarization element 8 changes, the length of the path of the incident light in the film (optical thickness of the film) changes. Accordingly, the wavelength range in which interference takes place (the wavelength which can screen or attenuate a certain portion of the polarized light) changes. This circumstance is called the "shift of the screening wavelength characteristic of the multilayer film."

This means that, when the polarization element is irradiated directly with nonparallel light without using a collimating lens or a collimating mirror, the angle of incidence is greater, and the screening wavelength characteristic shifts more, the closer the approach to the outer peripheral area of the region of the multilayer film to be irradiated.

When the light wavelength characteristic shifts, the light passes unchanged through the polarization element without being polarized, even if the light is in a certain wavelength range.

Figure 2A:
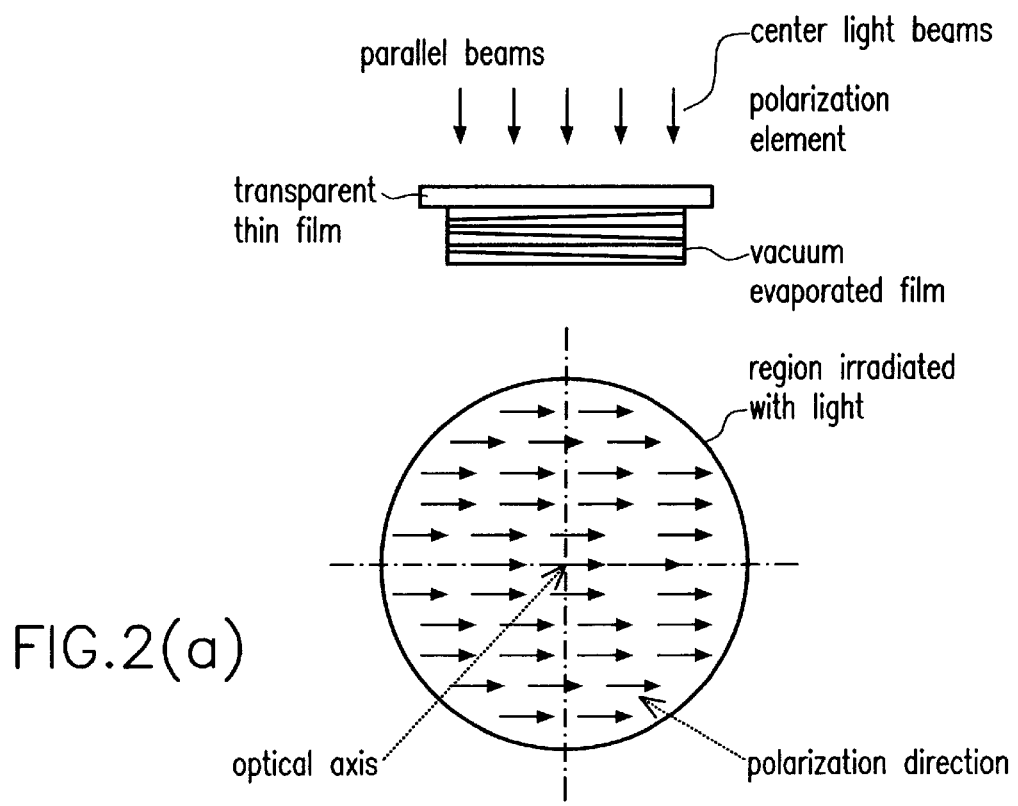
FIGS. 2(a) and 2(b) each show a schematic in which the extinction ratio of the polarized light is made uniform by means of the integrator lens when a polarization element using a multilayer film is used.
Figure 2B:
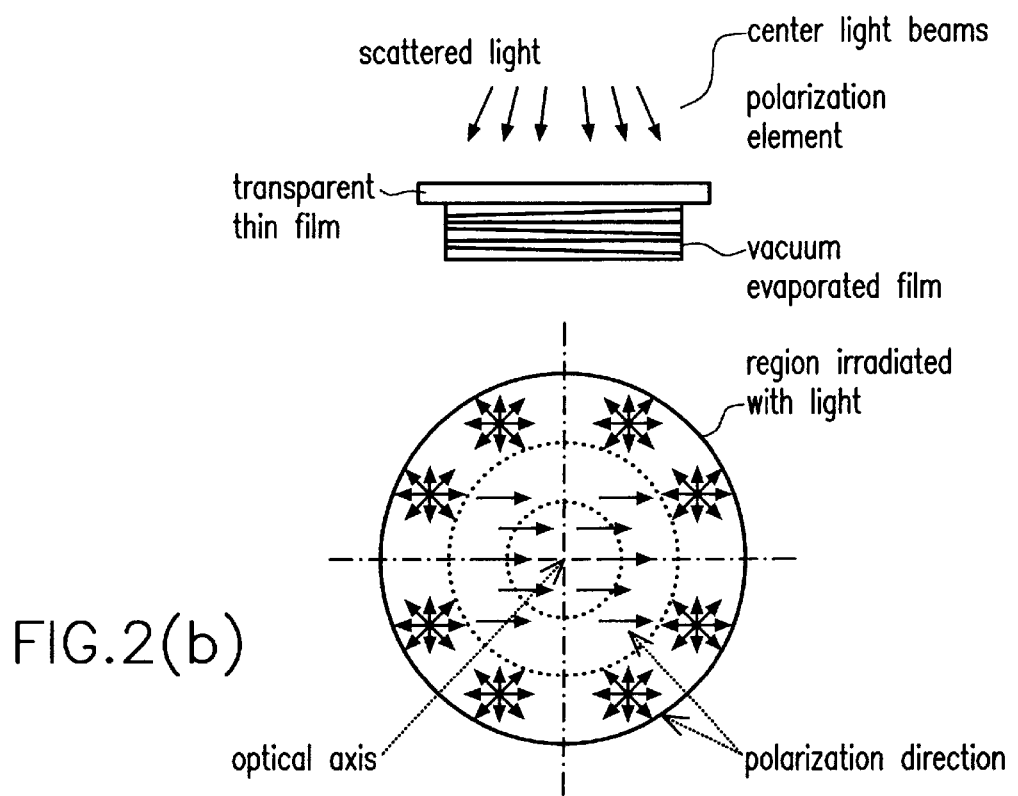

FIG. 2(a) is a schematic of the polarization direction in the area to be irradiated in the case in which parallel light has been incident on the polarization element using a multilayer film (an interference film). FIG. 2(b) is a schematic of the polarization direction in the region to be irradiated in the case in which scattered light has been incident on the polarization element using a multilayer film (an interference film). The polarization direction is shown using arrows in the drawings.

In the case of incidence of parallel light on the polarization element using a multilayer film, the polarization direction in the region to be irradiated is the same over the entire region, as shown in FIG. 2(a).

Conversely, in the case in which scattered light is incident on the polarization element, in the vicinity of the optical axis where the angle of incidence of the light is roughly 0 degrees, polarized light is obtained as shown in FIG. 2(b). The angle of incidence is however greater, the closer the approach to the outer peripheral area of the region to be irradiated. Depending on the light incidence angle, unpolarized light is obtained in the outer peripheral area. In the vicinity of the optical axis of the region to be irradiated, therefore, in a certain wavelength range, polarized light is obtained, while in the outer peripheral area, unpolarized light is obtained.

In FIG. 1, the light emerging from the polarization element 8 is incident on the integrator lens 4 which makes distribution of the portion of unpolarized light or distribution of illuminance of the polarized light in a certain direction and the distribution of the polarization direction uniform. Therefore, the unpolarized light in the outer peripheral area of polarization element 8 is scattered by the action of the integrator lens 4 over the entire region to be irradiated, by which the extinction ratio of the polarized light over the entire region to be irradiated is made uniform.

The directivity of the portion of unpolarized light and the directivity of the portion of polarized light are added to one another by the integrator lens 4 as is illustrated in FIGS. 2(a) and 2(b). The polarization direction is made uniform over the entire region to be irradiated.

The light emerging from the integrator lens 4 is incident via the shutter 5 on the bandpass filter 11. The light in a certain wavelength range which has passed through the bandpass filter 11 is incident via a second planar mirror 6 on a workpiece W, such as a liquid crystal cell element or the like.

The light incident on the workpiece W, as illustrated in FIG. 3, is light which contains a portion of unpolarized light and a portion of polarized light. The extinction ratio of the polarized light over the entire region to be irradiated is uniform. If the extinction ratio of the polarized light with which the alignment layer is irradiated has a certain value, optical alignment of the alignment layer can be performed. Thus, optical alignment of the entire region of the workpiece W can be produced without disruption.

When the alignment layer of a liquid crystal cell element is aligned, one pixel is divided into two or more pixels and the alignment direction of the liquid crystals is changed in the respective pixel formed by division, by which the angle of view field of the liquid crystal display is improved. This process is called the pixel division process or multi-domain method.

In the case of using optical alignment for this pixel division process, using a mask, a part of the pixel formed by division is irradiated with polarized light. Then the mask is exchanged and the other part of the pixel formed by division is irradiated with polarized light in a polarization direction which differs from the first irradiation direction. By repeating this process as often as the number of divisions, the alignment direction of the liquid crystals can be changed in the respective pixel formed by division. In this case, irradiation with parallel light is feasible because only the desired parts are exactly irradiated with polarized light via the mask.

Figure 4:
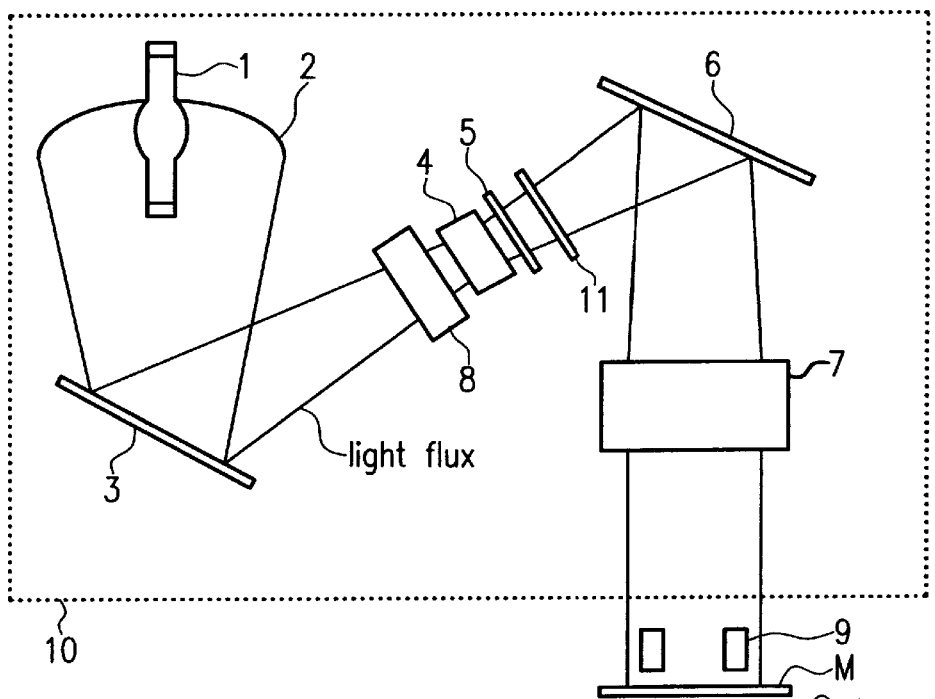
FIG. 4 shows a schematic of a case in which the irradiation device as shown in FIG. 1 is used for a pixel division process.

In the case of using the irradiation device in this embodiment for this pixel division process, as shown in FIG. 4, on the outlet side of the second planar mirror 6, there is a collimating lens 7 which is used to obtain parallel light. Furthermore, there is an alignment microscope 9 by which positioning of a mask M relative to the workpiece W is performed. Then, the parallel light emerging from the collimating lens 7 is emitted via the mask M onto the workpiece W. Thus, optical alignment is produced in the respective pixel formed by division. In this case as well, the polarization element 8 need not be located on the outlet side of the collimating lens 7. The polarization element 8 can be located on the incidence side of the integrator lens 4 with a small light flux.

In the irradiation device in this embodiment, as was described above, the polarization element 8 is located on the incidence side of the integrator lens 4 with a small light flux. Thus, the distribution of the portion of unpolarized light or distribution of illuminance of the polarized light in a certain direction and the distribution of the polarization direction are made uniform by the integrator lens 4. Therefore, using a small polarization element, optical alignment of the entire region of workpiece W can be produced without disruption. Furthermore, use of a polarization element using light interference of an inorganic, multilayer film as the polarization element 8 prevents the polarization element from degrading when irradiated with strong light or UV radiation and at a high temperature of the polarization element.

Figure 5:
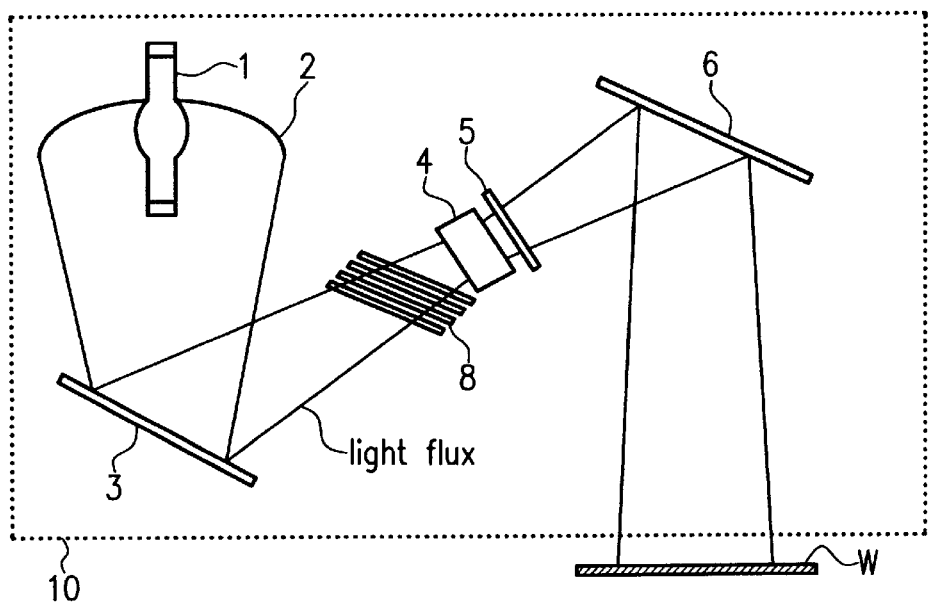
FIG. 5 shows a schematic of a second embodiment of the irradiation device as claimed in accordance with the invention.

FIG. 5 schematically shows a second embodiment of the above described approach (1) in accordance with the invention. Here, a polarization element with the Brewster angle is used.

In FIG. 5, the same parts as in FIG. 1 are provided with the same reference numbers. In this embodiment, the polarization element 8 using the Brewster angle is located on the incidence side of the integrator lens 4.

In the figure, the light which contains the UV radiation emitted from the lamp 1 is focused by the oval focusing mirror 2 and is reflected by the first planar mirror 3, and the scattered light is incident on the polarization element 8 using the Brewster angle.

The polarization element 8 transmits essentially 100% of the polarized light, when the angle of incidence of the incident light is the Brewster angle. However, if it is outside the Brewster angle, the degree of transmission of the portion of polarized light decreases. Furthermore, the polarization direction changes as a function of the angle of incidence of the incident light.

Figure 6:
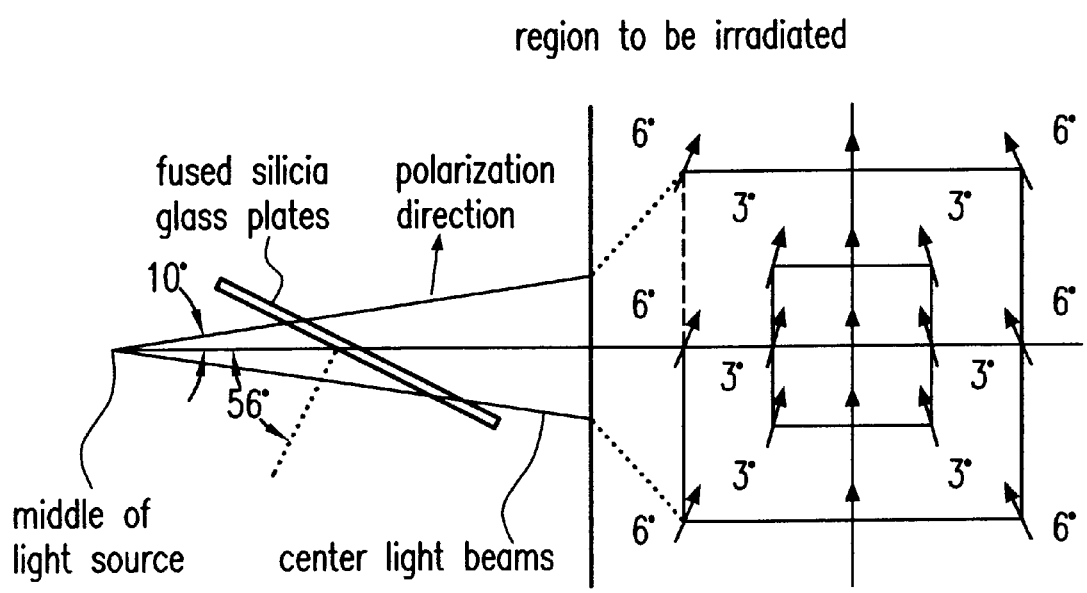
FIG. 6 shows a schematic of a case in which, for a polarization element using the Brewster angle on the surface or back of the glass plate, a multilayer film is formed.

Also, there are cases in which the polarization direction in the outer peripheral region of the polarization element changes as a function of the conditions of the arrangement of the polarization element and of the angle of incidence of the light. If, for example, scattered light is incident on a polarization element which made of 15 fused silica glass plates, the polarization direction on both sides of the region to be irradiated is tilted by a maximum of 6°, as is shown in FIG. 6.

This means that the different angle of incidence changes the ratio of the transmitted portion of S-polarized light relative to the transmitted portion of P-polarized light. The polarization direction is therefore determined by the direction of the resultant of the vector of the S-polarized light and the vector of the P-polarized light. The polarization direction is therefore changed.

Figure 7A:
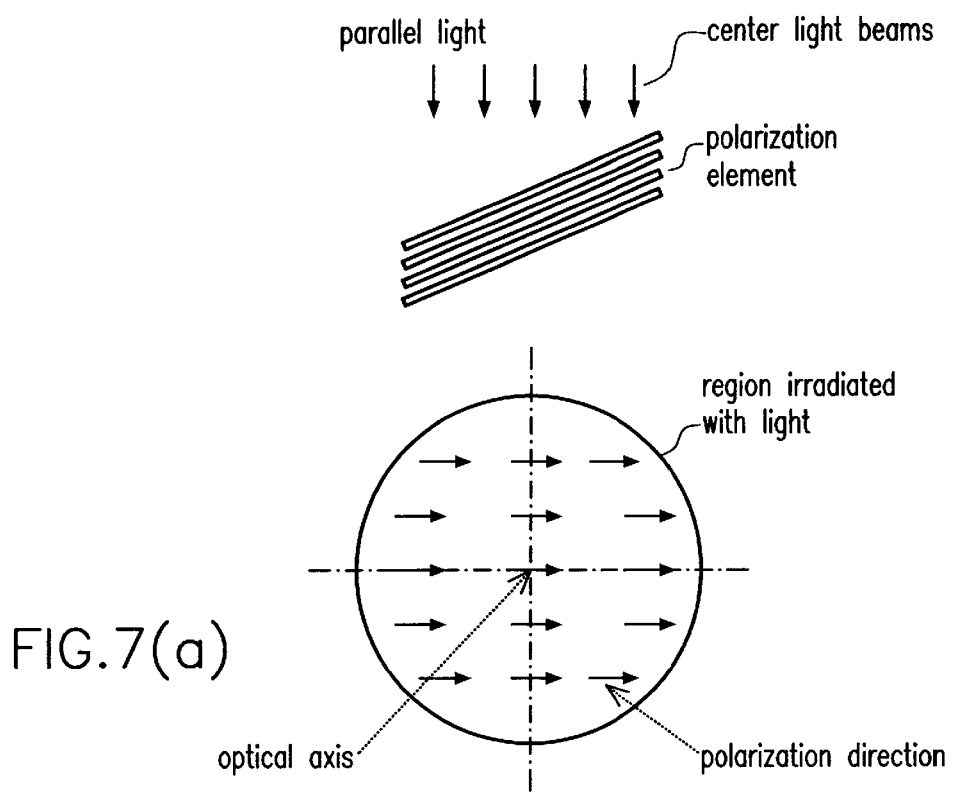
FIGS. 7(a) and 7(b) each shows a schematic of a case in which, for a polarization element using the Brewster angle on the surface or back of the glass plate, a multilayer film is formed.
Figure 7B:
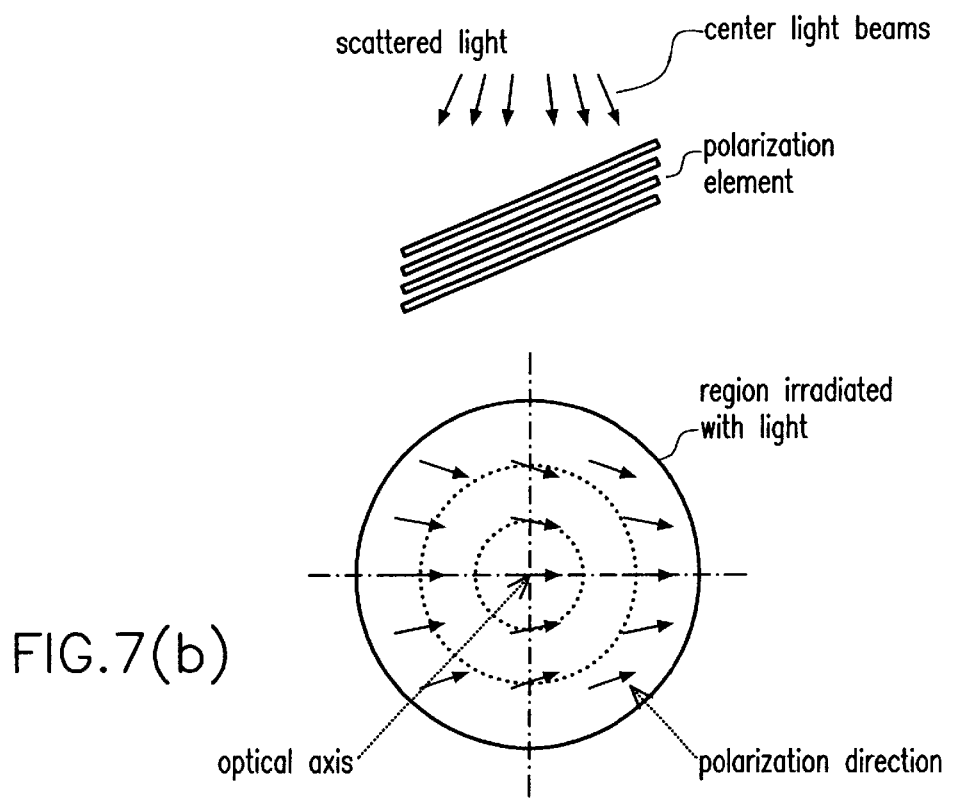

In the following, these circumstances are described in greater detail. FIG. 7(a) is a schematic of the polarization direction in the region to be irradiated in the case of incidence of parallel light on a polarization element using the Brewster angle. FIG. 7(b) is a schematic of the polarization direction in the region to be irradiated in the case of incidence of scattered light on a polarization element using the Brewster angle. The polarization direction is shown by arrows in the drawings.

In the case of incidence of parallel light on a polarization element using the Brewster angle, as is illustrated in FIG. 7(a), the polarization direction in the region to be irradiated is the same over the entire region. If, on the other hand, scattered light is incident on the polarization element, the ratio of the portion of S-polarized light to the portion of P-polarized light changes more, the closer the approach to the outer area of the region to be irradiated, as is shown in FIG. 7(b). When the direction of the arrows in the representation is designated P-polarized light, on the outer area of the region to be irradiated, the portion of S-polarized light gradually increases.

In the polarization element using the Brewster angle, the glass plates are tilted with respect to the optical axis by the Brewster angle. With only one glass plate, a low polarization separation efficiency is obtained. To increase the extinction ratio, therefore, usually several glass plates are arranged in parallel at a distance from one another, as is illustrated in FIGS. 7(a) and 7(b).

In the polarization element using the Brewster angle, the amount of irradiation in the outer peripheral area of the region to be irradiated decreases more than in the middle area of the region to be irradiated. The polarization direction in the middle area of the region to be irradiated therefore differs from the polarization direction in the outer peripheral area of the region to be irradiated, as is illustrated in FIG. 7(b).

In FIG. 4, the light emerging from the polarization element 8 is incident on the integrator lens 4. Since the integrator lens 4 makes the distribution of the portion of unpolarized light or distribution of illuminance of the polarized light in a certain direction and the distribution of the polarization direction uniform, the low illuminance of the polarized light in the outer peripheral area of the polarization element 8 and the high illuminance of the polarized light in the center region are made uniform.

Figure 8:
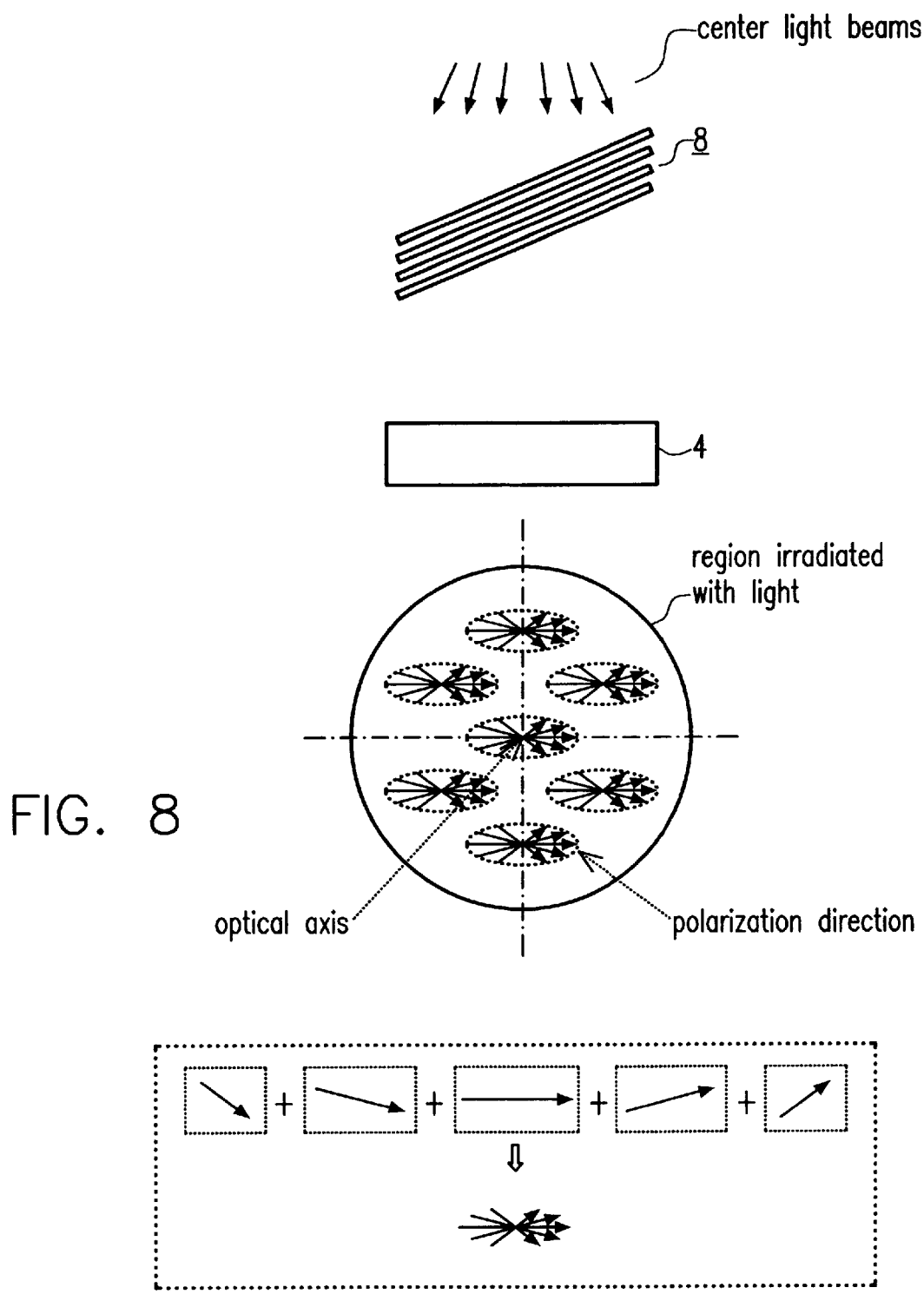
FIG. 8 shows a schematic of the inclination of the polarization direction in the case of incidence of the scattered light on a polarization element using the Brewster angle.

Furthermore, the polarized light with different polarization directions is scattered over the entire region to be irradiated, by which the extinction ratio of the polarized light in a certain direction is made uniform over the entire region to be irradiated. This means that the portions of polarized light with different polarization directions are added to one another by the integrator lens, as is illustrated in FIG. 8. The direction of the polarization is made uniform over the entire region to be irradiated.

The light emerging from the integrator lens 4 is incident via the shutter 5 and the second planar mirror 6 onto a workpiece W, such as a liquid crystal cell element or the like. The light incident on the workpiece W is formed by adding the portions of polarized light with different directions, as is illustrated in FIG. 8. If the extinction ratio of the polarized light with which the alignment layer is irradiated has a certain value, optical alignment of the alignment layer can be achieved.

Therefore, optical alignment of the entire region of the workpiece W can be performed without disruption.

In the case of use of the irradiation device in this embodiment for the pixel division process, the collimating lens 7 which is used to obtain parallel light is located on the outlet side of the second planar mirror 6, as was described relative to FIG. 4. The parallel light emerging from the collimating lens 7 is emitted via the mask M onto the workpiece W. Optical alignment is produced in the respective pixel formed by division.

In the irradiation device in this embodiment, as in the first embodiment, the polarization element 8 is located on the incidence side of the integrator lens 4 with a small light flux, which makes distribution of the portion of unpolarized light or distribution of illuminance of the polarized light in a certain direction and the distribution of the polarization direction uniform. Therefore, using a small polarization element, optical alignment of the entire region of the workpiece W can be obtained without disruption. Furthermore, using a polarization element in which the glass plates are used as the inorganic material prevents degradation of the polarization element upon irradiation with strong light or UV radiation and at a high temperature.

In this case, if a polarization element using the Brewster angle formed of several glass plates is used as the polarization element 8, the portion of reflected S-polarized light, reflection from the surface of the first glass plate on the incidence side being ignored, is reflected over several paths by the surfaces and the backs of other glass plates; this yields a stray beam which is slightly transmitted by the polarization element.

To reduce the S-polarized light which passes through the polarization element 8 by multi-path reflection, on at least one of the glass plates which form the polarization element, a film with a high transmission factor for P-polarized light and a high reflectance factor for S-polarized light can be vacuum evaporated.

Figure 9A:
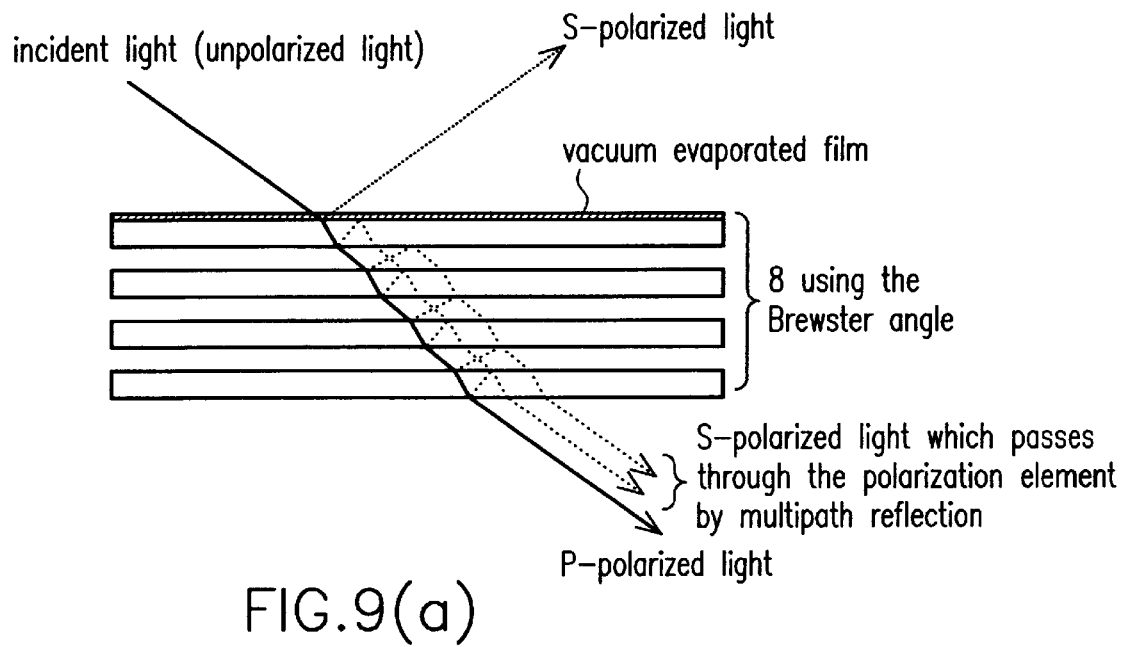
FIGS. 9(a) and 9(b) each shows a schematic of a case in which, for a polarization element using the Brewster angle on the surface or back of the glass plate, a multilayer film is formed.
Figure 9B:
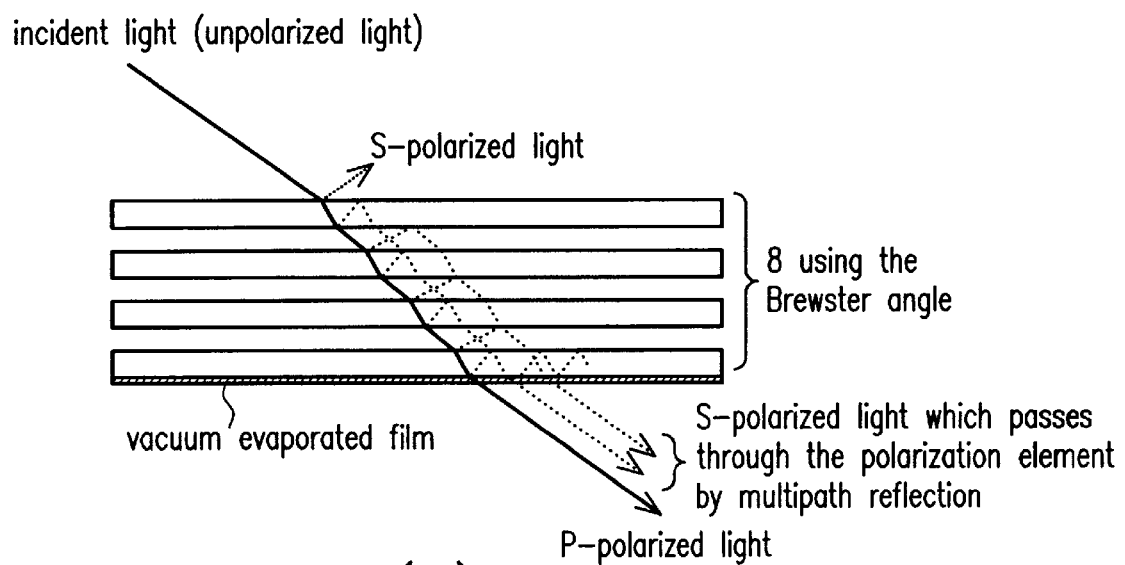

FIGS. 9(*a*) and (*b*) each show schematically an embodiment in which in a polarization element using the Brewster angle which consists of several glass plates, a multilayer film with a high transmission factor for P-polarized light and a high reflection factor for S-polarized light is vacuum evaporated on a glass plate to improve the extinction ratio.

By vacuum evaporating the multilayer film with a high transmission factor for P-polarized light and a high reflection factor for S-polarized light on the surface of the first glass plate, of the unpolarized light incident on the polarization element 8, most of the portion of S-polarized light is reflected by the multilayer film, as is shown in FIG. 9(*a*). The remaining portion of S-polarized light which has passed through the first glass plate executes multi-path reflection, as is shown in the figure. It emerges from the polarization element 8. Since the portion of S-polarized light is reflected for the most part by the surface of the first glass plate which has the most intensive reflection for S-polarized light, the portion of S-polarized light which undergoes multi-path reflection is extremely low. Therefore, hardly any S-polarization light emerges from the polarization element 8. Thus, the portion of S-polarized light incident on the polarization element can be most effectively reduced.

A vacuum evaporated film with a physical layer thickness of roughly 1 micron can be used here; it is produced by layering hafnium oxide ($HfO_2$) and silicon dioxide ($SiO_2$) twelve times on top of one another.

The multilayer film need not necessarily be formed on the surface of the first glass plate. It can also be formed on the surface or the back of any glass plate starting with the second glass plate. Furthermore, it can be formed on the surfaces of several glass plates. If, for example, on the last glass plate on the light emergence side, a multilayer film is formed, ignoring reflection from the surface of the first glass plate on the incidence side, the portion of reflected S-polarized light is reflected over several paths by the surfaces and the backs of other glass plates and reaches the glass plate on the last stage, as is shown in FIG. 9(*b*). Since it is reflected by the multilayer film which is located on the back of the glass plate on the last stage, the portion of S-polarized light emerging from the polarization element 8 can be greatly reduced, as is shown in FIG. 9(*a*).

However, in this case, the portion of S-polarized light is not reduced as effectively as in vacuum evaporation of a multilayer film on the surface of the first glass plate. The reason for this is that the portion of S-polarized light reflected by the multilayer film undergoes multi-path reflection by the top glass plates on the incidence side and in part returns to the glass plate on the lowermost stage. Therefore, it is effective to vacuum evaporate the multilayer film on the glass plate that is as uppermost as possible (on the incidence side) to reduce the portion of S-polarized light.

With consideration of the following points, it is possible to select where in a polarization element using the Brewster angle, the glass plate on which the multilayer film is vacuum evaporated should be located under several glass plates, i.e. where is the optimal location:

Limitation with respect to the arrangement of the irradiation device, for example, maintenance of the glass plate on which the multilayer film is vacuum evaporated (there are cases in which a vacuum evaporated film is degraded depending on its material by atmospheric humidity or solvent contained in air, for example, acid, alkali, organic substances or the like. In this case replacement, regeneration or the like is necessary as the maintenance measure).

required extinction ratio.

Figure 10:
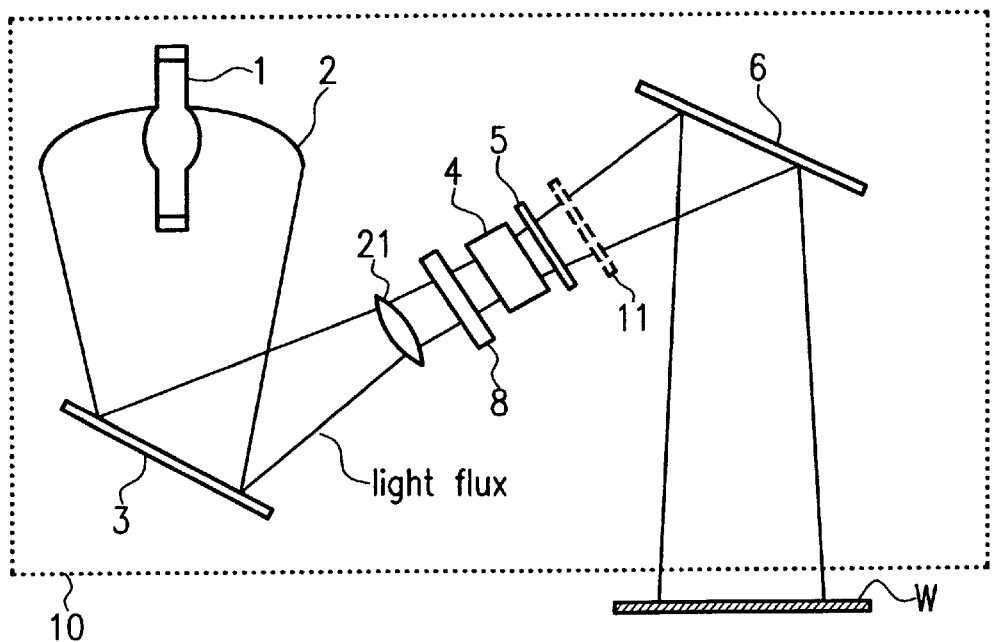
FIG. 10 shows a schematic of a first embodiment of the irradiation device of the invention according to approach (2)

In the following, the above described approach (2) of the invention is described. FIG. 10 schematically shows one embodiment thereof. In the figure, the same parts as in FIGS. 1 and 12 are provided with the same reference numbers. In this embodiment, on the incidence side of the integrator lens 4, there are an input lens 21 for converting the convergence light focussed by the oval focusing mirror 2 into parallel light and a polarization element 8 using a multilayer film or the Brewster angle.

In the FIG. 10, the light which contains the UV radiation emitted from the lamp 1 is focused by the oval focusing mirror 2, is reflected by the first planar mirror 3 and is incident on the input lens 21. The input lens 21 converts the light focused by the oval focusing mirror 2 into parallel light and allows it to be incident on the polarization element 8. The polarization element 8 is comprised of a multilayer film or is produced using the Brewster angle. In the case of a polarization element using the multilayer film, by means of an interference effect, a portion of polarized light with certain wavelengths is screened or attenuated.

The light emerging from the polarization element 8 is incident on the integrator lens 4, by which scattered light emerges. This emerged light is incident via a shutter 5 on a second planar mirror 6. The light reflected by the second planar mirror 6 is emitted onto the workpiece W, such as a liquid crystal cell element or the like.

Since the light incident from the input lens 21 onto the polarization element 8 is converted into parallel light, the polarization direction of the polarized light emerging from the polarization element 8 is uniform over the entire region to be irradiated. Therefore, trouble-free optical alignment of the entire region of the workpiece W can be performed.

In this irradiation device, by the above described measure that the polarization element 8 is located on the incidence side of the integrator lens 4 with a small light flux and the parallel light emerging from the input lens 21 incident on the polarization element 8, using a small polarization element, trouble-free optical alignment of the entire region of the workpiece W can be produced.

Furthermore, using a polarization element utilizing light interference of an inorganic multilayer film, or using the Brewster angle as the polarization element 8, prevents degradation of the polarization element for irradiation with strong light or UV radiation and at a high temperature.

Figure 11:
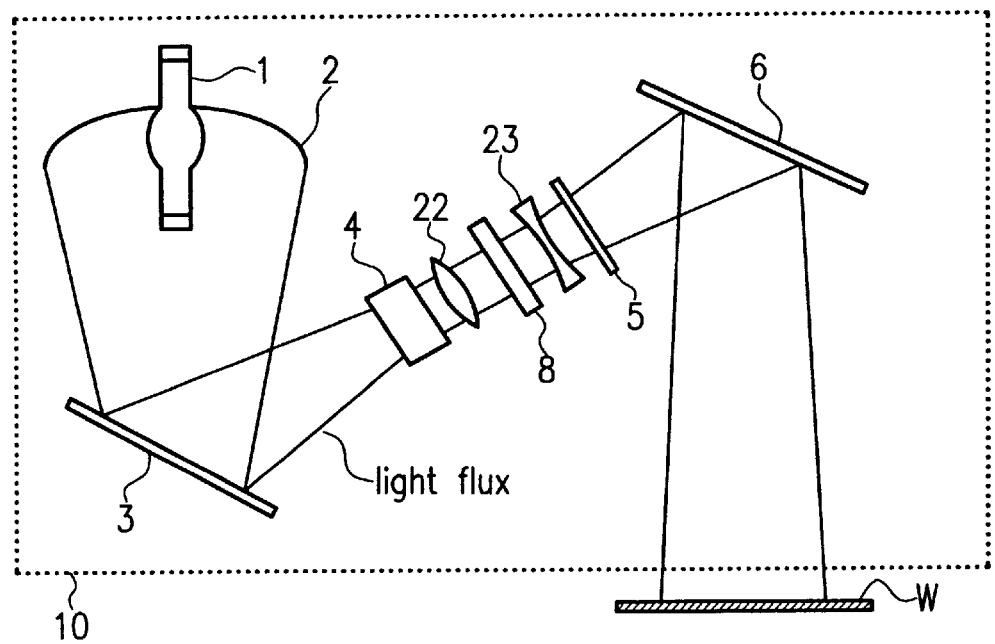
FIG. 11 shows a schematic of a first embodiment of the irradiation device of the invention according to approach (3)

In the following the above described approach (3) of the invention is described. FIG. 11 schematically shows one embodiment thereof. In this figure, the same parts as in FIGS. 1, 10 and 12 are provided with the same reference numbers. In this embodiment, on the outlet side of integrator lens 4, a first lens 22 for converting the light emerging from the integrator lens 4 into parallel light and a polarization element 8 are located. Furthermore, there is a second lens 23 for scattering the parallel light emerging from the polarization element 8.

In the FIG. 1, the light emitted form the lamp 1, which contains the UV radiation 1, is focused by an oval focusing mirror 2, reflected by a first planar mirror 3, and is incident on an integrator lens 4. The light emerging from the integrator lens 4 is incident on a first lens 22, is converted into parallel light, and is incident on the polarization element 8. The polarization element 8 is produced, as described above, using a multilayer film or using the Brewster angle.

The parallel light emerging from the polarization element 8 is incident on the second lens 23 and is converted into scattered light; its exit light is incident via shutter 5 on the second planar mirror 6. The light reflected by the second planar mirror 6 is emitted onto a workpiece W, such as a liquid crystal cell element or the like. When using a polarization element having a multilayer film as the polarization element 8, for example, there is a bandpass filter 11 on the outlet side of the shutter 5.

Since the light incident on the polarization element 8 from the second lens 22 is converted into parallel light, the polarization direction of the polarized light emerging from the polarization element 8 is uniform over the entire region to be irradiated. Therefore, trouble-free optical alignment of the entire region of the workpiece W can be achieved.

Furthermore, by the measure that there is a second lens 23 and the parallel light emerging from the polarization element 8 is converted into scattered light, the flux of light emerging from the polarization element 8 can propagate and the required irradiation area on the light irradiation surface ensured.

If the embodiments of the irradiation device described above using FIGS. 10 and 11 are used for the pixel division process, in the device shown in FIG. 4, on the outlet side of the second planar mirror 6 there is a collimating lens 7 for obtaining parallel light. The parallel light emerging from the collimating lens 7 is emitted onto the workpiece W via a mask M. In the respective pixel formed by division, optical alignment is obtained.

As was described above, in accordance with the invention, the following effects can be obtained.

(1) The polarization element can be made smaller by placing the polarization element on the inlet side or outlet side of the integrator lens with a small light flux. Thus, different polarization elements with low costs can be used.

(2) The need for a large device is obviated even if optical alignment of an alignment layer of a large liquid crystal cell element is produced. Thus, space can be saved, and furthermore, the costs of the device reduced.

(3) Since a polarization element using an inorganic multilayer film or a polarization element comprised of glass plates using the Brewster angle can be used, degradation of the polarization element when irradiated with strong light or UV radiation and at a high temperature is prevented. In this way, the service life of the device can be increased.

(4) By vacuum evaporating a dielectric multilayer film with a high transmission factor for P-polarized light and a high reflection factor for S-polarized light on at least one glass plate, in the polarization element using the Brewster angle, the S-polarized light passing through the polarization element can be reduced. This means that the desired extinction ratio of the polarized light can be obtained without specially increasing the number of glass plates required for that purpose.

Since, in this way, only a few glass plates are needed, the amount of deviation of the optical axis due to passage through the polarization element can be reduced and the optical construction simplified.

Furthermore, the need for a large device can be obviated since a small polarization element is adequate. At the same time, even with consideration of the process of producing the multilayer film by vacuum evaporation, costs can be cut since only a few expensive glass plates are needed.

We claim:

1. Irradiation device for an alignment layer of a liquid crystal cell element, comprising:
    a lamp;
    a focusing mirror for focusing light emitted from said lamp;
    an integrator lens; and
    a polarization element located on an incident side of the integrator lens.

2. Irradiation device for an alignment layer of a liquid crystal cell element as claimed in claim 1, wherein the polarization element is a filter having vacuum evaporated multilayer film on a substrate and constructed in a manner causing light in a predetermined wavelength range to be polarized; and wherein, for light incident on the filter, adjacent layers of the multilayer film have different indexes of refraction with respect to a defined portion of polarized light.

3. Irradiation device for an alignment layer of a liquid crystal cell element as claimed in claim 1, wherein in the polarization element comprises several glass plates which are parallel to each other with a spacing therebetween, said plates being inclined with respect to an optical axis by the Brewster angle.

4. Irradiation device for an alignment layer of a liquid crystal cell element as claimed in claim 3, wherein at least one of the glass plates has a vacuum evaporated film thereon, said film having a high transmission factor for P-polarized light and a high reflectance factor for S-polarized light.

5. Irradiation device for an alignment layer of a liquid crystal cell element, comprising:

a lamp;

a focusing mirror for focusing light emitted from said lamp;

an integrator lens having at least two lens elements;

an input lens which converts beams in an optical path, which emerge from a central area of an opening of the focusing mirror and which are incident in a center area of a respective lens element of the integrator lens, into parallel beams on an incidence side of the integrator lens, and which is located between the focusing mirror and the integrator lens; and a polarization element which is located in said optical path at a location between the input lens and the integrator lens.

6. Irradiation device for an alignment layer of a liquid crystal cell element as claimed in claim 5, wherein the polarization element comprises a filter having a vacuum evaporated multilayer film on a substrate and which polarizes light in a predetermined wavelength range; and wherein, for the light incident on the filter, adjacent layers of the multilayer film have different indexes of refraction with respect to a defined portion of polarized light.

7. Irradiation device for an alignment layer of a liquid crystal cell element as claimed in claim 5, wherein in the polarization element comprises a plurality of glass plates which are parallel to each other with a spacing therebetween, and which are inclined with respect to the optical path by the Brewster angle.

8. Irradiation device for an alignment layer of a liquid crystal cell element as claimed in claim 7, wherein a vacuum evaporated film with a high transmission factor for P-polarized light and a high reflectance factor for S-polarized light is provided on at least one of the glass plates.

* * * * *